(12) United States Patent
Crebbe

(10) Patent No.: US 6,193,110 B1
(45) Date of Patent: Feb. 27, 2001

(54) INTERNAL MIX DISPENSER

(75) Inventor: Neil Crebbe, Indianapolis, IN (US)

(73) Assignee: Glas-Craft, Inc., Indianapolis, IN (US)

( * ) Notice: Subject to any disclaimer, the term of this patent is extended or adjusted under 35 U.S.C. 154(b) by 0 days.

(21) Appl. No.: 09/288,198

(22) Filed: Apr. 8, 1999

(51) Int. Cl.[7] ..................................................... B67D 5/54
(52) U.S. Cl. ................................ 222/145.5; 222/145.1; 239/414
(58) Field of Search ........................... 222/145.1, 145.5, 222/504; 251/149, 150; 137/607; 239/310, 412, 413, 414, 433

(56) References Cited

U.S. PATENT DOCUMENTS

| | | | |
|---|---|---|---|
| 3,263,928 | * | 3/1975 | Gusmer ................................. 239/414 |
| 3,799,403 | * | 3/1974 | Probst et al. .......................... 222/135 |
| 3,873,023 | * | 3/1975 | Moss et al. ............................. 239/3 |
| 4,019,652 | * | 4/1977 | Suh et al. ........................... 222/145.5 |
| 4,397,407 | * | 8/1983 | Skoupi et al. ...................... 222/145.5 |
| 4,453,670 | * | 6/1984 | Sirovy ................................... 239/117 |
| 4,474,310 | * | 10/1984 | Muller et al. ...................... 222/145.5 |
| 4,708,292 | * | 11/1987 | Gammons ............................. 239/414 |
| 4,773,562 | * | 9/1988 | Gueret .................................. 239/414 |
| 5,148,946 | * | 9/1992 | Mizuta et al. ............................ 222/1 |

* cited by examiner

*Primary Examiner*—Kevin Shaver
*Assistant Examiner*—David Deal
(74) *Attorney, Agent, or Firm*—Brinks Hofer Gilson & Lione

(57) ABSTRACT

An improved internal mix plural component dispensing apparatus can be easily disassembled for repair and maintenance and reduces the surfaces that are exposed to mixed plural component material. In the dispenser, a dispenser body and a movable valving-mixing element are combined so that the dispenser body movably carries the entire valving-mixing element within a central cavity of the dispenser body and the valving-mixing element is movable between a forward dispensing position and a rearward non-dispensing position and is removable from the dispenser body after the removal of a single dispenser body closure.

17 Claims, 2 Drawing Sheets

INTERNAL MIX DISPENSER

FIELD OF THE INVENTION

The present invention relates to an apparatus for the internal mixing and dispensing of plural component materials, and particularly to an improved apparatus for the internal mixing and dispensing of resins and catalyst of polyester.

BACKGROUND OF THE INVENTION

Multi-component application systems have been used, for example, in manufacturing plastic articles by applying resinous materials to a mold or perform for an article, or to pre-arranged fiber reinforcing materials, or with fiber reinforcing materials as they are being applied.

In multi-component application systems, a liquid resin and a curing agent for the resin are most generally mixed and dispensed into molds or onto articles or preformed substrates where the curing agent and resin react and harden. In spraying applications, the resin and curing agent components are mixed together, either externally or internally of the apparatus, and the mixture is directed onto a substrate, such as a preform, as a plural component spray.

In internal mix systems, the resin and catalyst are mixed within the spraying apparatus, and the mixture is then dispensed by a nozzle and directed onto the substrate. Complete and thorough mixing of the resin and catalyst is vital to avoid non-uniform hardening of the resin on the substrate and other undesirable results. Furthermore, mixed resin and catalyst must be removed from an internal mix apparatus to avoid blockage of the apparatus by cured resin, and such apparatus are generally flushed with flows of compressed air and/or solvent to prevent such blockage.

U.S. Pat. No. 3,799,403 discloses an internal mix dispensing apparatus including a mixing chamber that is movable with respect to the housing of the device. In the disclosed apparatus, moving the mixing chamber to the mix position causes the components of the plural component material to be introduced into the mixing chamber, appropriately mixed and then dispensed; and thereafter moving the mixing chamber to the purge position terminates the introduction of components into the mixing chamber and introduces compressed air into the mixing chamber to substantially purge residue component material from the mixing chamber and its cooperatively associated orifice. In addition, the compressed air can be employed during the dispensing of the mixture of component materials of the plural component material so as to assist in atomizing particles of the material from the terminus of the mixture of plural component material as such material is ejected from the orifice of the device and to assist in shaping the spray pattern of the plural component material particles.

In spraying systems using compressed air, the quantity of air used and its substantially controllable expansion in the workplace can create problems. It is expensive to compress air, and the large quantities of compressed air used by existing systems can impose a significant operating cost on the system. In addition, the blast of compressed air used to atomize liquid components carries a significant quantity of spray particles away from the substrate, wastes the expensive material, creates an unclean spray area, contributes to the problem of operating such manufacturing operations safely and frequently requires overspray collection systems. Furthermore, the use of large quantities of air during operation of the system can often create an undesirable spread of fumes, and create a problem in meeting environmental standards.

In addition, in internal mix dispensers, the failure and wear of internal seals and improper maintenance can result in mixed plural component materials, such as polyester resins, hardening within the dispensing apparatus and requiring its disassembly and repair before it can be satisfactorily operated again.

BRIEF SUMMARY OF THE INVENTION

The invention provides an improved internal mix plural component dispensing apparatus which can be easily disassembled for repair and maintenance and reduces the surfaces that are exposed to mixed plural component material. In the invention, a dispenser body and a movable valving-mixing element are combined so that the dispenser body movably carries the entire valving-mixing element within a central cavity of the dispenser body and the valving-mixing element is movable between a forward dispensing position and a rearward non-dispensing position and is removable from the dispenser body after the removal of a single dispenser body closure.

In one preferred embodiment of an internal mix dispenser of the invention, a dispenser body forms a cavity having a rear portion with cylindrical walls and a forward portion with a pair of opposed planar walls, with the forward cavity portion having a smaller cross-section than the rear cavity portion, and a valving-mixing assembly is movably carried within the dispenser body between a dispensing and a non-dispensing position and is removable therefrom by removal of a single body closure. In one such preferred embodiment, the valving-mixing assembly includes a piston portion at its rear, a spring with a portion being engaged with a transverse wall portion of the dispenser, and a forward valving-mixing portion including a central bore closed at its rear and extending forwardly to an outlet opening, and a pair opposed planar sides, with one passageway extending from one of the planar sides to the central bore, and a second passageway extending from the other of the planar sides to the central bore.

Liquid component delivery means may be fastened to the dispenser body and provide a passageway for delivery of resin and a first seal surrounding the resin passageway that is adapted to seat on the planar side of the valving-mixing portion having the one passageway, and further provide a passageway for delivery of catalyst and a second seal surrounding the catalyst passageway that is adapted to seat on the other planar side of the valving-mixing portion. The first and second seals and the planar sides of the valving and mixing portion cooperate to block the flow of resin and catalyst when the valving-mixing assembly is in the non-dispensing position. The single body closure for the cavity may be removably attached to the rear of the dispenser body, and can form, with said rear portion of the cavity, an air cylinder. Removal of the body closure permits the entire valving-mixing assembly to be removed in one piece from the dispenser body for maintenance and repair of the valving and mixing assembly and the internal surfaces of the dispenser body.

The dispenser body can have a compressed air inlet into its rear cavity portion rearwardly of the piston portion of the valving-mixing assembly so that the admission of compressed air into the air inlet moves the valving-mixing assembly forwardly within said dispenser body to the dispensing position where the first and second passageways of valving-mixing portion are in communication with the resin and catalyst passageways of the liquid component delivery means for the admission of resin and catalyst to the central bore for mixing and dispensing. The forward movement of the valving and mixing assembly reduces the surfaces forwardly of its outlet orifice that are exposed to mixed plural component material, and can compress the spring of the valving and mixing assembly between its piston portion and a transverse wall portion of the dispenser body between the forward and rear portions of dispenser body cavity so that upon release of the compressed air from the rear body, the spring can return the valving-mixing assembly to the non-dispensing position. In preferred dispensers, the dispenser body an include a smaller cylindrical sealing cavity located forwardly of transverse wall body portion and having a diameter intermediate in size between the rear cavity portion and the forward cavity portion, and the valving-mixing assembly can include a sealing plug and O-ring seals forwardly of the spring, sealingly engaging the cylindrical walls of the sealing cavity. The dispenser body can include a second compressed air inlet to the rear cavity forwardly of the piston portion of the valving-mixing assembly to permit the admission of compressed air to the rear cavity to assist the spring in moving the valving-mixing assembly to the non-dispensing position and to permit compressed air to purge the passageways and central bore of the valving-mixing assembly and any internal surfaces forwardly thereof.

In addition, a preferred dispenser can include a dispenser body with a flange at its forward end, and a nozzle carrier, removably received by the flange and including a seal adapted to cooperate with a sealing surface of the flange. In such preferred embodiments, the nozzle carrier can include a central cylindrical bore; and the valving-mixing portion can include a forwardly projecting cylindrical portion including the outlet opening and carrying one or more seals adapted for sealing engagement with the central cylindrical bore of the nozzle carrier.

In addition, the dispenser body can include a handle carrying an air valve connectable with a source of compressed air, a trigger for operation of the air valve, and compressed air conduits for connection of the air valve with compressed air inlets of the dispenser body.

Other features and advantages of the invention will be apparent from the drawings and more detailed description that follows.

BRIEF DESCRIPTIONS OF THE DRAWINGS

DETAILED DESCRIPTION OF BEST MODE

Figure 1:
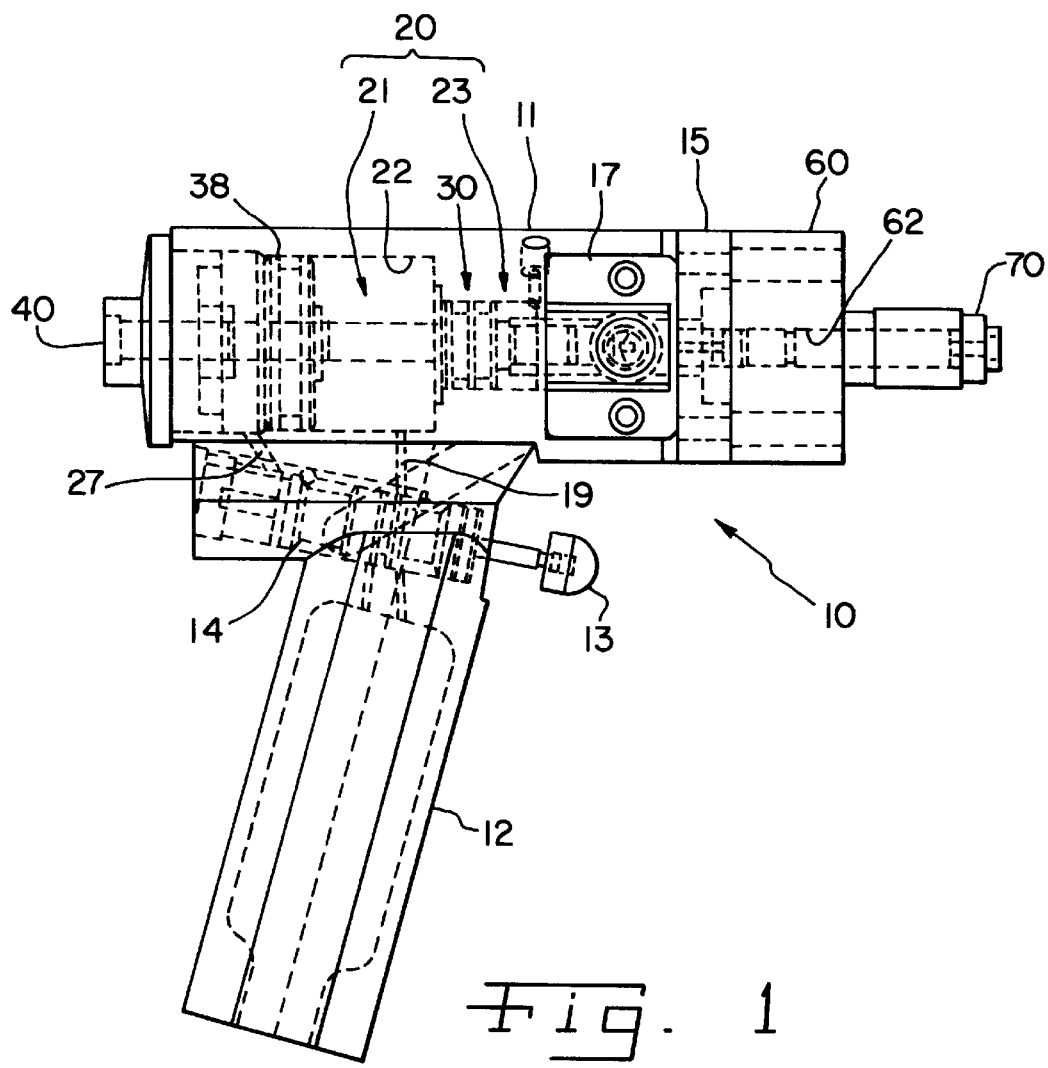
FIG. 1 is a side view of a hand-manipulatable embodiment of the invention with its interior shown with phantom-dashed lines.

FIGS. 1 through 5 illustrate a presently preferred embodiment of a dispenser 10 of the invention in the form of a hand-manipulatable apparatus, although the invention is equally applicable to apparatus that is not hand-manipulatable and is operated by an air valve or valves located remotely from the dispenser.

The plural component dispensing gun 10 includes a dispenser body 11, handle 12 extending from the barrel at an angle thereto, and trigger 13. The dispenser body 11, the handle 12 and the trigger 13, as well as appropriate other parts of the gun 10, may be fabricated from suitable wear-resistant materials that are chemically inert with respect to the liquid components to be used and the material which results from the components being mixed. Suitable materials include metal, such as aluminum, aluminum alloys, steel, and plastic, such as acetyl resin, epoxy, glass-filled epoxy, glass-filled nylon and the like.

The dispenser body 11 is connected at its forward portion to liquid component delivery means 16, 17 comprising, as shown in FIG. 1, an inlet block 16 for polyester resin and an inlet block 17 for a resin catalyst, such as MEKP. As known in the art, inlet block 16 may be connected through appropriate valving and hoses with a pumped source of resin, and inlet block 17 may be connected through appropriate valving and hoses with a pumped source of catalyst.

Figure 3:
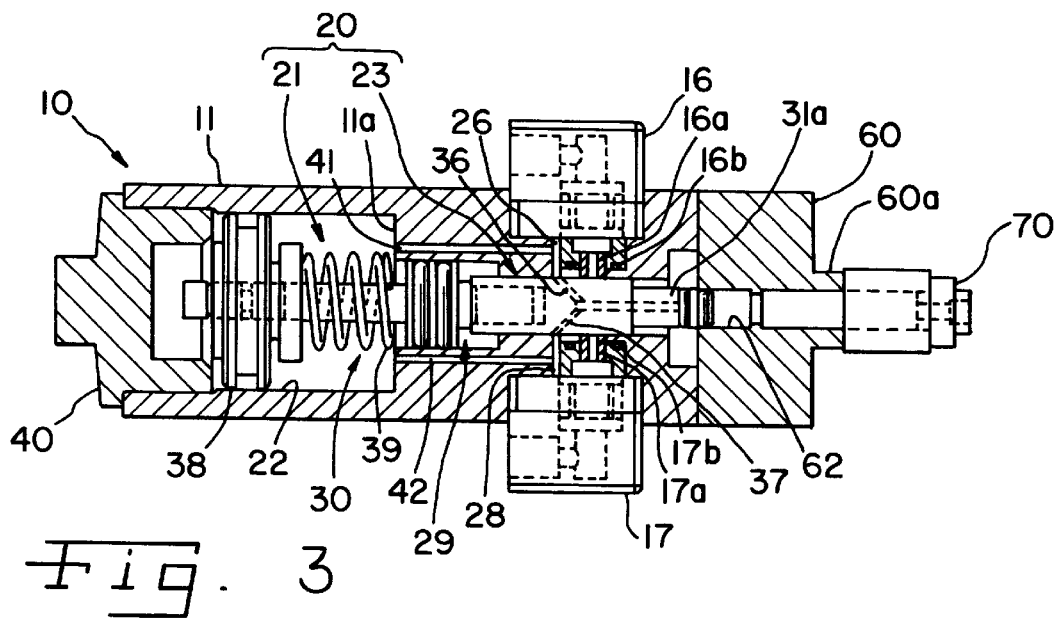
FIG. 3 is a partially cutaway top view of the dispenser of FIG. 1 to illustrate the non-dispensing condition of the dispenser.
Figure 4:
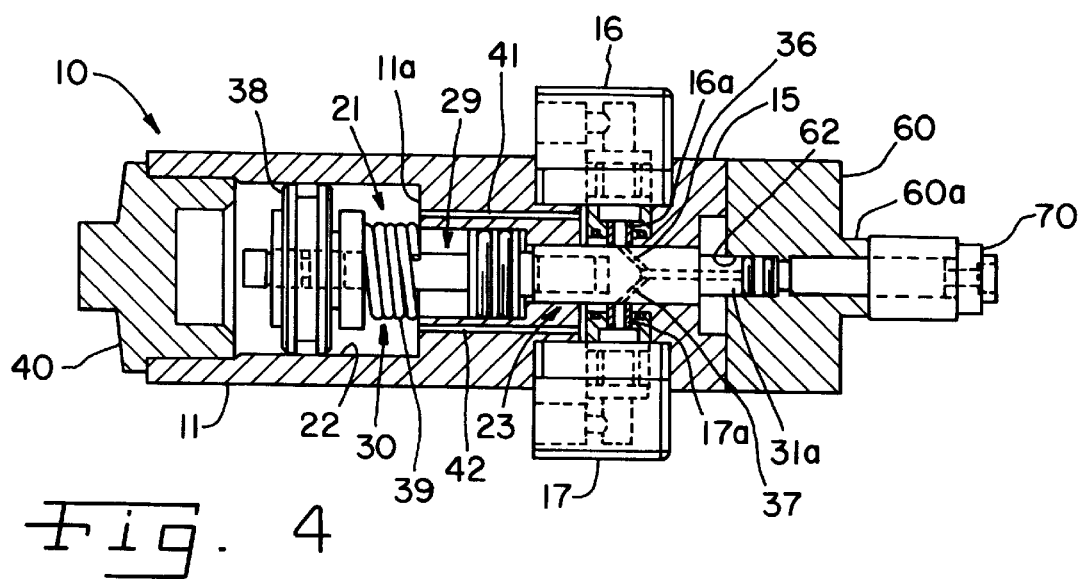
FIG. 4 is a partially cutaway top view of the dispenser of FIGS. 1 and 3 to illustrate the dispensing condition of the dispenser.
Figure 5:
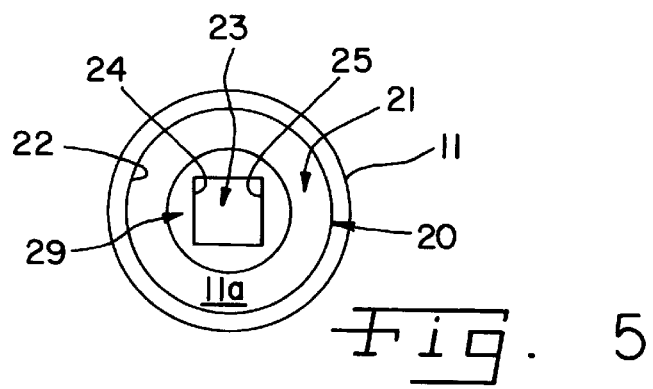
FIG. 5 is a view of the dispenser body from the rear without its closure to illustrate its central cavity.

As illustrated in FIGS. 1, 3 and 4, the dispenser body 11 forms a central cavity 20 that carries a valving-mixing assembly 30. The central cavity 20 includes a rear portion 21 with cylindrical walls 22, and a forward portion 23, shown in FIGS. 3, 4 and 5, with a pair of opposed planar walls 24, 25. The central cavity 20 is closed at the rear of the dispenser body 11 by a closure 40 which is removably fastened to the dispenser body. The forward cavity portion 23 has a smaller cross-section than the rear cavity portion 21 (as shown by FIG. 5, which is a view of central cavity 20 from the rear of dispenser body 11 with closure 40 removed). The dispenser body 11 includes a transverse wall portion 11a between its rear portion 21 and forward portion 23.

Figure 2:
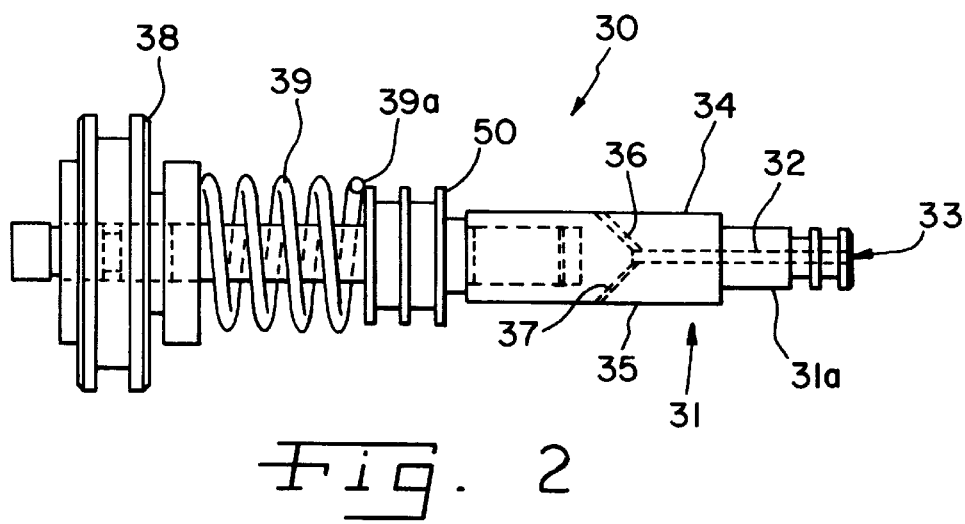
FIG. 2 is a top view of the valving-mixing assembly of the dispensing apparatus of FIG. 1.

As further illustrated in FIGS. 1, 3 and 4, the dispenser body 11 movably carries a valving-mixing assembly 30, which is illustrated in FIG. 2. The valving-mixing assembly 30 is shown in phantom dashed lines in FIG. 1. Valving-mixing assembly 30 comprises a forward portion 31 including a central bore 32 closed at its rear and extending forwardly to an outlet opening 33. The forward valving-mixing portion 31 of the valving-mixing assembly 30 has a pair of opposed planar sides 34, 35. A large passageway 36 extends from the planar side 34 to the central bore 32 and a small passageway 37 extends from the planar side 35 to the central passageway 32. Liquid components that are urged through the large and small passageways 36, 37 are mixed in the central bore 32 and dispensed from outlet 33. The difference in the sizes and flow restrictive characteristics of the large resin passageway 36 and the small catalyst passageway 37 assist in controlling the proportioning and mixing of the two liquid components. The valving-mixing assembly 30 also includes a piston portion 38 at its rear and a spring 39 forwardly of the piston portion. The spring 39 has a forward portion 39a that engages the transverse wall portion 11a of the dispenser body 11.

As shown in phantom dashed lines in FIG. 1, dispenser body 11 also includes a passageway 27 for compressed air leading to the rear cavity portion 21 rearwardly of the piston portion 38 of the valving-mixing assembly 30. In the hand-operated embodiment shown, the handle 12 includes an air valve 14 controlled by trigger 13 so the dispenser user can control the flow of compressed air to the rear cavity of the dispenser body 11 by operation of trigger 13 and thereby switch the dispenser between its non-dispensing and dispensing modes, which are illustrated in FIGS. 3 and 4, respectively.

As well known in the art, a four-way air valve 14 can be carried in the handle and, when operated by depression of trigger 13, can connect passageway 27 leading to the cavity 21 at the rear of piston 38 with a source of compressed air and can connect passageway 19 leading to the cavity 21 forwardly to piston 38 to atmosphere, and when the trigger 13 is not depressed, can connect passageway 27 with atmosphere and passageway 19 with a source of compressed air.

As illustrated in FIGS. 3 and 4, inlet block 16 provides a first passageway 16a and a first seal 16b surrounding the first passageway 16a, and inlet block 17 provides a second passageway 17a and a second seal 17b surrounding the second passageway 17a. The first and second seals 16b and 17b are adapted to cooperate with the planar sides 34 and 35, respectively, of the valving-mixing portion 31 of valving-mixing assembly 30 to block the flow of liquid from the first and second passageways 16a and 17a. As known in the art, such seals can include spring-loaded, lubricious tubular members that are sealingly but yieldingly carried in the inlet blocks 16, 17 and urged by their spring-loading into sealing engagement with planar side surfaces 34, 35 of the valving-mixing portion 31, and if necessary, supplementary O-ring seals 16b, 17b can be also provided around the passageways 16a, 17a.

In the non-dispensing mode of FIG. 3, the valving-mixing assembly 30 is held in a rearward position in the central cavity 20 of the dispenser body 11 by the force applied by spring 39 which is in compression between the piston portion 38 of the valving-mixing assembly 30 and the transverse wall portion 11a of the dispenser body 11. In its rearward position, the forward valving-mixing portion 31 of the valving-mixing assembly 30 is positioned with its large and small passageways 36, 37 out of register with the liquid passageways 16a and 17a and the flows of resin and catalyst are blocked. As further illustrated by FIG. 3, the large passageway 36 and small passageway 37 in their rearward position may be aligned with passageways 26 and 28 formed in the dispenser body 11 so that the application of compressed air and/or solvent through passageways 26 and 28 can automatically purge the passageways 36, 37 and central bore 32 of the valving-mixing portion 31 and any passageways forwardly of outlet 33 in the non-dispensing mode of operation.

In the dispensing mode of FIG. 4, the valving-mixing assembly 30 has been moved forwardly by the application of compressed air in the rear cavity portion 21 behind piston portion 38 of the valving-mixing assembly 30, where it is held by the compressed air in the dispensing position against the force resulting from the further compression of spring 39 between the piston portion 38 and transverse wall portion 11a of the dispenser body. In the forward dispensing position, the large passageway 36 of the valving-mixing portion 31 is aligned with passageway 16a of inlet block 16 and small passageway 37 of the valving-mixing portion 31 is aligned with passageway 17a of inlet block 17 so that both resin and catalyst may be urged to flow from sources of resin and catalyst through large passageway 36 and small passageway 37, respectively, to within central bore 32 for mixing and dispensing from outlet opening 33 of the valving-mixing portion 31.

As described above, central cavity 20 of the dispenser body 11 is closed at its rear by a closure 40 that is removably fastened to the dispenser body 11. Preferably, the closure 40 is a threaded cap that can be screwed into the dispenser body 11 to close cavity 20 and to form an air cylinder with the piston portion 38 of the valving-mixing assembly 30. As illustrated by FIG. 5, the central cavity 20 is formed to be progressively larger from its forward (23) to its rearward (21) portions; and, as illustrated in FIG. 2, the valving-mixing assembly 30 is progressively smaller from its rearward (38) to its forward (31) portions. Thus, with the removal of closure 40, which can be easily accomplished, the entire valving-mixing assembly 30 can be removed from the rear of the dispenser 10 and the dispenser 10 may be easily and conveniently cleaned, serviced, maintained and repaired.

In addition, as shown by comparison of FIGS. 3 and 4, the movement of the valving-mixing assembly 30 forwardly within the dispenser body 11 reduces the volume and surface area of any passageway forward of outlet opening 33, reducing the volume of mixed polyester material to be purged and the surface area exposed to mixed polyester to be flushed.

As further shown by FIGS. 2–4, in preferred embodiments, the valving-mixing assembly 30 can be provided with a cylindrical sealing plug 50 having a cross-section less than the piston portion 38 and larger than the forward portion 31 of the valving and mixing assembly 30, and the dispenser body 11 may have a cylindrical sealing cavity 29 between its rear portion 21 and its forward portion 23 having an intermediate size adapted to provide sealing engagement with one or more O-ring seals carried by the sealing plug 50. In such a preferred embodiment, compressed air can be introduced through a four-way valve 14 to passageway 19 forwardly of piston portion 38 to assist spring 39 in moving the valving-mixing assembly rearwardly during transition between the dispensing and non-dispensing modes of operation as shown in FIG. 1. Such compressed air may also be used to purge passageways 36, 37 and central bore 32 of the valving-mixing assembly by the addition of one or more passageways (e.g., passageways 40, 42 of FIGS. 3 and 4) in the dispenser body between the forward portion of the rear cavity 21 and the passageways 26, 28.

The illustrated preferred embodiment illustrated includes a nozzle carrier 60 that may be removably fastened to a flange 15 formed at the front of the dispenser body 11. The nozzle carrier 60 may include a seal (not shown) adapted to cooperate with a sealing surface of the flange 15. Furthermore, the nozzle carrier 60 may include a central cylindrical bore 62, and the valving-mixing portion 31 may have a projecting cylindrical portion 31a (FIGS. 2 and 4) that carries one or more O-ring seals adapted to cooperate with and seal the central cylindrical bore 62 of the nozzle carrier 60, as indicated by FIGS. 3 and 4. The nozzle carrier 60 preferably includes a threaded projecting portion 60a to permit the attachment (with changeability) of various dispensing nozzles 70. As illustrated by FIGS. 3 and 4, the forward movement of the valving-mixing assembly 30 within the dispensing body 11 reduces the volume and surface area of the passageway 62 of the nozzle carrier 60 that is forwardly of the outlet orifice 33 of the valving and mixing assembly 11.

Embodiments other than the preferred embodiment described and illustrated above can be devised to incorporate various disclosed features of the invention. In other embodiments, the forward end of the dispenser body 11 may include a nozzle carrier portion, like 60a, and a central cylindrical bore, like 62, that is engaged with a projecting cylindrical portion 31a and seals of the front of the valving-mixing assembly. For example, in addition, while the preferred embodiment is illustrated as being operated with a controlled application of compressed air, other means for moving the valving-mixing element of the invention may be used, such as mechanical linkage between a manually operated trigger and the valving-mixing element, hydraulically operated actuators and the like. Further, while the movement of the valving-mixing element forwardly to the dispensing position is preferred in the invention, a rearward movement of the valving-mixing element to the dispensing position within the dispensing body may be employed without loss of the ease or removability of the valving-mixing element by a single dispenser body closure. Other embodiments of the invention may be devised without departing from the scope of the claims that follow.

What is claimed is:

1. An internal mix dispenser, comprising:

a dispenser body forming a cavity having a rear portion with cylindrical walls and a forward portion with a pair of opposed planar walls, said forward cavity portion having a smaller cross-section than said rear cavity portion with a transverse wall body portion therebetween, a valving-mixing assembly movably carried within said dispenser body between a forward dispensing position and a rearward non-dispensing position, said valving mixing assembly including a piston portion at its rear, a spring forwardly of the piston portion with a forward portion that is engagable with the transverse wall portion of said dispenser body, a valving-mixing forward portion including a central bore closed at its rear and extending forwardly to an outlet opening, a pair of opposed planar sides, a large passageway extending from one of the planar sides to the central bore, a small passageway extending from the other of the planar sides to the central bore, liquid component delivery means adapted to be fastened to said dispenser body, said component delivery means providing a first passageway for delivery of resin and a first seal surrounding said first passageway and being adapted to seat on the planar side of one valving-mixing portion having the large passageway, and providing a second passageway for delivery of catalyst and a second seal surrounding the second passageway and being adapted to seat on the other planar side of the valving-mixing portion, said first and second seals and said planar walls of the valving-mixing portion cooperating to block the resin and catalyst when the valving-mixing assembly is in the rearward non-dispensing position, and a closure for said cavity removably attachable to the rear of said body, said closure forming, with said rear portion of the cavity, an air cylinder, said body having a compressed air inlet into its rear portion rearwardly of the piston portion of the valving-mixing assembly so that the admission of compressed air into the air inlet moves the valving-mixing assembly forwardly within said dispenser body to the dispensing position where said large and small passageways of valving-mixing portion are in communication with said first and second passageways of the liquid component delivery means for the admission of resin and catalyst to the central bore for mixing and dispensing, said forward movement compressing said spring so that upon release of the compressed air from said rear body, said spring returns said valving-mixing assembly to the non-dispensing position.

2. The dispenser of claim 1 wherein said body includes a smaller cylindrical sealing cavity located forwardly of said transverse wall body portion and having a diameter intermediate in size between the rear cavity portion and the forward cavity portion, and said valving-mixing assembly includes a sealing plug forwardly of said spring and O-ring seals, sealingly engaging the cylindrical walls of the sealing cavity.

3. The dispenser of claim 1 wherein said body includes a flange at its forward end to receive a nozzle carrier; a nozzle carrier, including a seal adapted to cooperate with a sealing surface of said flange, is removably fastened to said flange; said nozzle carrier includes a central cylindrical bore; and said valving and mixing portion includes a forwardly projecting cylindrical portion including said outlet opening and carrying one or more seals adapted for sealing engagement with the central cylindrical bore of said nozzle carrier, the forward portion of the nozzle carrier being adapted to permit the attachment of different dispensing orifices.

4. The dispenser of claim 1 wherein said dispenser body includes a second compressed air passageway to the rear cavity forwardly of the piston portion of the valving and mixing assembly to permit the admission of compressed air to the rear cavity to assist the spring in moving the valving-mixing assembly to the non-dispensing position.

5. The dispenser of claim 1 wherein said body includes a handle carrying an air valve connectable with a source of compressed air and a trigger for operation of the air valve, and a compressed air conduit connects said air valve with said compressed air inlet of said body.

6. An internal mix dispenser, comprising:

a dispenser body forming an internal cavity having a rear portion with cylindrical walls and a forward portion with a pair of opposed planar walls and forwardly thereof a cylindrical bore, a valving-mixing assembly movably carried within said dispenser body between a forward dispensing position and a rearward non-dispensing position, said valving-mixing assembly including a piston portion at its rear and a forward valving-mixing portion including a forwardly projecting cylindrical portion and a central bore closed at its rear and extending forwardly to an outlet opening in the forwardly projecting cylindrical portion, and a pair of opposed planar sides rearwardly of the forwardly projecting cylindrical portion with passageways extending from each of the planar sides to the central bore, liquid component delivery means providing a first passageway for delivery of resin and a first seal surrounding said first passageway and being adapted to seat on one planar side of the valving-mixing portion, and providing a second passageway for delivery of catalyst and a second seal surrounding the second passageway and being adapted to seat on the other planar side of the valving-mixing portion, said first and second seals and said planar walls of the valving-mixing portion cooperating to block the resin and catalyst when the valving-mixing assembly is in the rearward non-dispensing position, and means for moving the valving-mixing assembly forwardly within said dispenser body to the dispensing position where said passageways of valving-mixing portion are in communication with said first and second passageways of the liquid component delivery means for the admission of resin and catalyst to the central bore for mixing and dispensing through the outlet opening of the forwardly projecting cylindrical portion of the valving-mixing assembly, said forward movement of the valving-mixing assembly advancing the forwardly projecting cylindrical portion into the cylindrical bore at the forward end of the dispenser body, said forwardly projecting cylindrical portion of the valving-mixing assembly and said cylindrical bore having cooperating sealing surfaces so that the forward movement of the valving-mixing assembly reduces the volume and surface area of the cylindrical bore forwardly of the outlet orifice that is exposed to mixed resin and catalyst.

7. The dispenser of claim 6 wherein said dispenser body includes a flange at its forward end to receive a nozzle carrier; a nozzle carrier, including a seal adapted to cooperate with a sealing surface of said flange, is removably fastened to said flange; said nozzle carrier includes a central cylindrical bore; and said forwardly projecting cylindrical portion carries one or more seals adapted for sealing engagement with the central cylindrical bore of said nozzle carrier; the forward portion of the nozzle carrier being adapted to permit the attachment of different dispensing orifices.

8. The dispenser of claim 6 wherein said dispenser body includes at least one compressed air inlet to the rear cavity for cooperation with the piston portion of the valving-mixing assembly to permit the admission of compressed air to the rear cavity for movement of the valving-mixing assembly and operation of the dispenser.

9. The dispenser of claim 8 wherein said body includes a handle carrying an air valve connectable with a source of compressed air and a trigger for operation of the air valve, and a compressed air conduit connects said air valve with said at least one compressed air inlet of said body.

10. In an internal mix dispenser including a dispenser body and a movable valving-mixing element, the improvement wherein the dispenser body movably carries the valving-mixing element within a central cavity and the valving-mixing element is movable between a forward dispensing position and a rearward non-dispensing position and is removable from the dispenser body after the removal of a single dispenser body closure.

11. The improvement of claim 10 wherein the dispenser body includes a central cavity having a rear portion with cylindrical walls and a forward portion with a pair of opposed planar walls, said forward cavity portion having a smaller cross-section than said rear cavity portion.

12. The improvement of claim 11 wherein the single dispenser body closure closes the rear cavity portion of the dispenser body.

13. The improvement of claim 10 wherein the valving-mixing assembly includes a piston portion at its rear, a spring forwardly of the piston portion with a forward portion that is engagable with said dispenser body, a valving-mixing forward portion including a central bore closed at its rear and extending forwardly to an outlet opening, a pair of opposed planar sides with a first passageway extending from one of the planar sides to the central bore and a second passageway extending from the other of the planar sides to the central bore, said first and second passageways conveying resin and catalyst to the central bore with the valving-mixing assembly in its forward dispensing position, said spring returning the valving-mixing assembly to the non-dispensing position when it is not being held in the forward dispensing position.

14. The improvement of claim 13 wherein said first and second passageways are in communication with purging passageways formed in the dispenser body, permitting cleansing air to be urged through the first and second passageways and central bore of the valving-mixing assembly while it is in the rearward non-dispensing position.

15. The improvement of claim 10 wherein the dispenser includes a central cylindrical bore at its forwardmost end, and said valving and mixing portion includes a forwardly projecting cylindrical portion including an outlet opening and carrying one or more seals adapted for sealing engagement with the central cylindrical bore of said dispenser, said forward movement of the valving-mixing assembly moving the outlet orifice forwardly in the central cylindrical bore to reduce the volume and surface area of the central cylindrical bore exposed to mixed resin and catalyst.

16. The improvement of claim 15 wherein the dispenser includes a nozzle carrier removably attached to and sealingly engaging the dispenser body at its forward end, said nozzle carrier including a central cylindrical bore portion, and wherein said forwardly projecting cylindrical portion of the valving-mixing assembly extends into the central cylindrical bore portion of the nozzle carrier and its one or more seals sealingly engage the central cylindrical bore portion of the nozzle carrier.

17. An internal mix dispenser, comprising:

a dispenser body forming a cavity having a rear portion with cylindrical walls and a forward portion with a pair of opposed planar walls, said forward cavity portion having a smaller cross-section than said rear cavity portion with a transverse wall body portion therebetween, a valving-mixing assembly movably carried within said dispenser body between a dispensing position and a non-dispensing position, a valving-mixing forward portion including a central bore closed at its rear and extending forwardly to an outlet opening, a pair of opposed planar sides, a first passageway extending from one of the planar sides to the central bore, and a second passageway extending from the other side of the planar sides to the central bore, liquid component delivery means providing a passageway for delivery of resin and a first seal surrounding said resin passageway and being adapted to seat on the planar side of the valving-mixing portion having said first passageway, and providing a second passageway for delivery of catalyst and a second seal surrounding the catalyst passageway and being adapted to seat on the other planar side of the valving-mixing portion, said first and second seals and said planar sides cooperating to block the resin and catalyst when the valving-mixing assembly is in the non-dispensing position, a closure for said cavity removably attachable to the rear of said body, and means for moving the valving-mixing assembly within said dispenser body to the dispensing position where said first and second passageways of valving-mixing portion are in communication with said resin and catalyst passageways of the liquid component delivery means for the admission of resin and catalyst to the central bore for mixing and dispensing, and for moving the valving-mixing assembly to the non-dispensing position.

* * * * *